United States Patent
Ichien et al.

(10) Patent No.: US 11,489,376 B2
(45) Date of Patent: Nov. 1, 2022

(54) STATOR, MOTOR, AND METHOD FOR MANUFACTURING STATOR

(71) Applicant: Nidec Corporation, Kyoto (JP)

(72) Inventors: Akira Ichien, Kyoto (JP); Yusuke Arao, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 127 days.

(21) Appl. No.: 17/014,156

(22) Filed: Sep. 8, 2020

(65) Prior Publication Data

US 2021/0083531 A1 Mar. 18, 2021

(30) Foreign Application Priority Data

Sep. 18, 2019 (JP) .............................. JP2019-169803
Mar. 31, 2020 (JP) .............................. JP2020-063481

(51) Int. Cl.
*H02K 1/14* (2006.01)
*H02K 1/16* (2006.01)
*H02K 15/02* (2006.01)

(52) U.S. Cl.
CPC ............... *H02K 1/148* (2013.01); *H02K 1/16* (2013.01); *H02K 15/02* (2013.01)

(58) Field of Classification Search
CPC ........ H02K 15/024; H02K 1/16; H02K 15/02; H02K 1/148
USPC ....................................... 310/216.004–216.9
See application file for complete search history.

(56) References Cited

U.S. PATENT DOCUMENTS 9,601,950 B2 3/2017 Yamamura et al.

FOREIGN PATENT DOCUMENTS

KR 20080090039 A * 10/2008
WO WO-0211270 A1 * 2/2002 ........... H02K 15/026

* cited by examiner

*Primary Examiner* — Jose A Gonzalez Quinones
(74) *Attorney, Agent, or Firm* — Keating & Bennett

(57) ABSTRACT

A stator is formed by laminating electrical steel sheets punched into a predetermined shape. The stator includes split cores that are punched out from the electrical steel sheets to have an annular shape. A first group of the split cores adjacent to each other in the circumferential direction have the same rolling direction, and a second group of the split cores adjacent to each other in the circumferential direction have different rolling directions.

16 Claims, 10 Drawing Sheets

STATOR, MOTOR, AND METHOD FOR MANUFACTURING STATOR

CROSS REFERENCE TO RELATED APPLICATION

The present application claims priority under 35 U.S.C. § 119 to Japanese Application No. 2019-169803 filed on Sep. 18, 2019 and Japanese Application No. 2020-063481 filed on Mar. 31, 2020, the entire contents of which are hereby incorporated herein by reference.

FIELD

The present disclosure relates to a stator, a motor, and a method for manufacturing a stator.

BACKGROUND

Hitherto, there is a stator in which split cores punched out from an electrical steel sheet are annularly combined to shape a stator core. The stator of International Publication No. 2012-160692 includes split cores that are punched out from an electrical steel sheet in a state in which the split cores are aligned in a straight line and parts of core backs are connected together. The split cores aligned in a straight line are arranged in an arc shape so that there is no gap between the core backs. The arc-shaped split cores are combined with each other to form an annular stator core.

SUMMARY

In the case of the stator of International Publication No. 2012-160692, since the split cores aligned in a straight line are bent around connected portions and arranged in an arc shape, strain may occur. In addition, cogging torque may increase, and initially expected rotation characteristics of the motor may not be exhibited.

Example embodiments of the present disclosure provide stators, motors, and methods for manufacturing stators, in each of which a motor easily exhibits the performance as designed.

A stator faces a rotor and includes a plurality of split cores punched out from an electrical steel sheet to have an annular shape. Of the plurality of split cores, a first group of split cores adjacent to each other in a circumferential direction have the same rolling direction, and a second group of split cores adjacent to each other in the circumferential direction have different rolling directions.

A motor includes the stator described above and a rotor facing the stator.

A method for manufacturing a stator is a method for manufacturing a stator in which X (X is a natural number of two or more) split cores punched out from the electrical steel sheet to have an annular shape. The split cores are punched out from the electrical steel sheet in group units of Y (Y is a natural number of two or more) less than X, with arc-shaped core backs extending in the same circumferential direction and connected to each other.

According to example embodiments of the present disclosure, it is possible to provide stators, motors, and methods for manufacturing stators, in each of which a motor easily exhibits the performance as designed.

The above and other elements, features, steps, characteristics and advantages of the present disclosure will become more apparent from the following detailed description of the example embodiments with reference to the attached drawings.

DETAILED DESCRIPTION

Hereinafter, example embodiments of stators and motors will be described with reference to the drawings.

Figure 1:
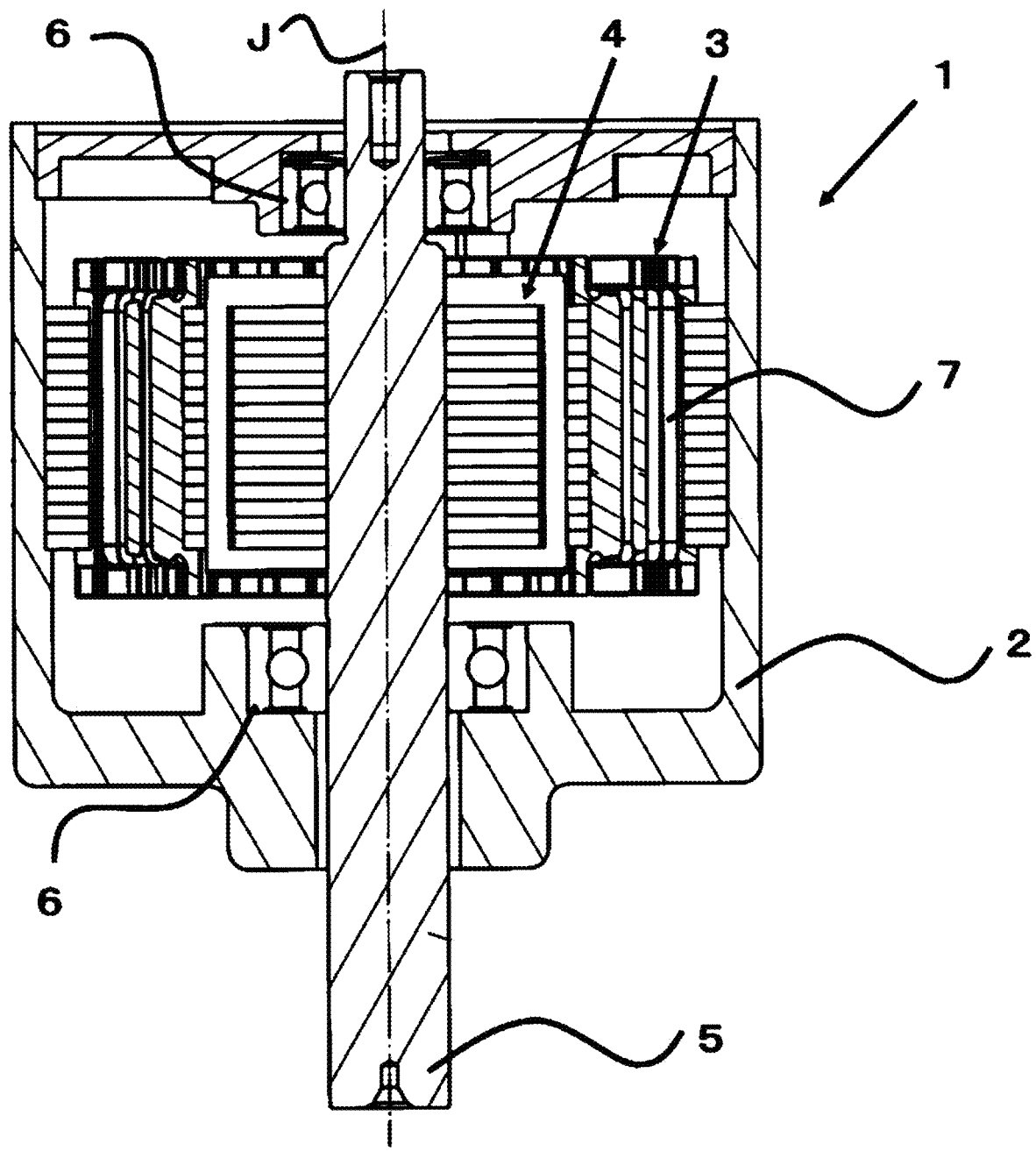
FIG. 1 is a sectional view of a motor according to an example embodiment of the present disclosure.

FIG. 1 is a sectional view of a motor according to an example embodiment of the present disclosure.

As illustrated in FIG. 1, a motor 1 includes a cylindrical housing 2, a stator 3 fixed to an inner peripheral surface of the housing 2, and a rotor 4 housed inside the stator 3 and rotating relative to the stator 3. The rotor 4 has a shaft 5 extending along a central axis J. Bearings 6 are interposed between the housing 2 and both end portions of the shaft 5 in an axial direction. The rotor 4 is rotatably supported by the housing 2 via the bearings 6.

Figure 2:
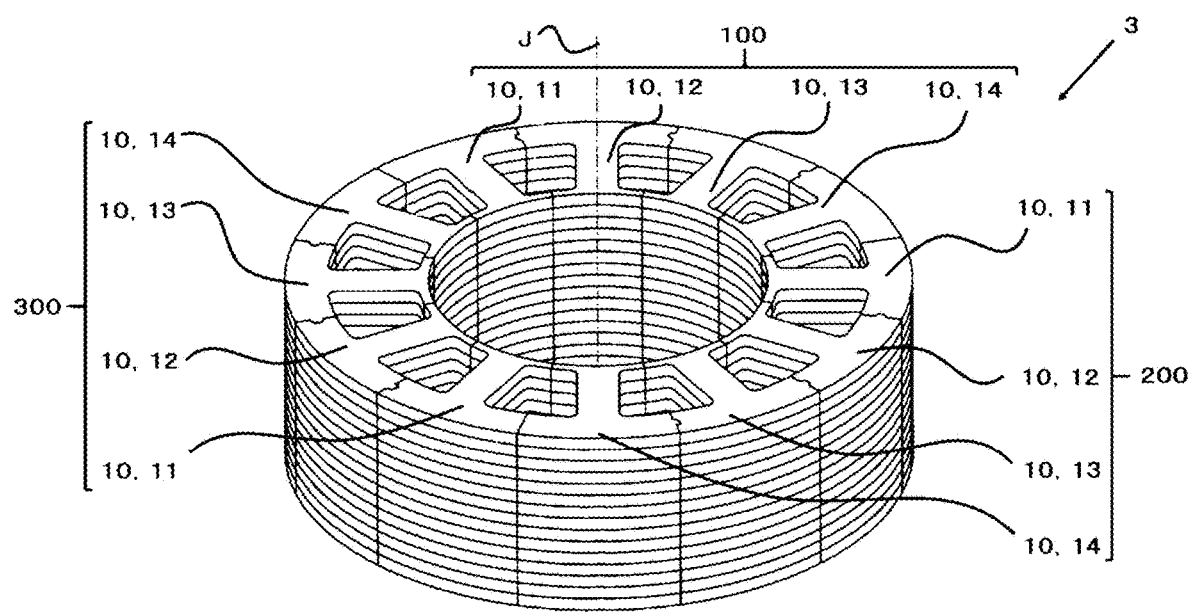
FIG. 2 is a perspective view of a stator according to an example embodiment of the present disclosure.
Figure 3:
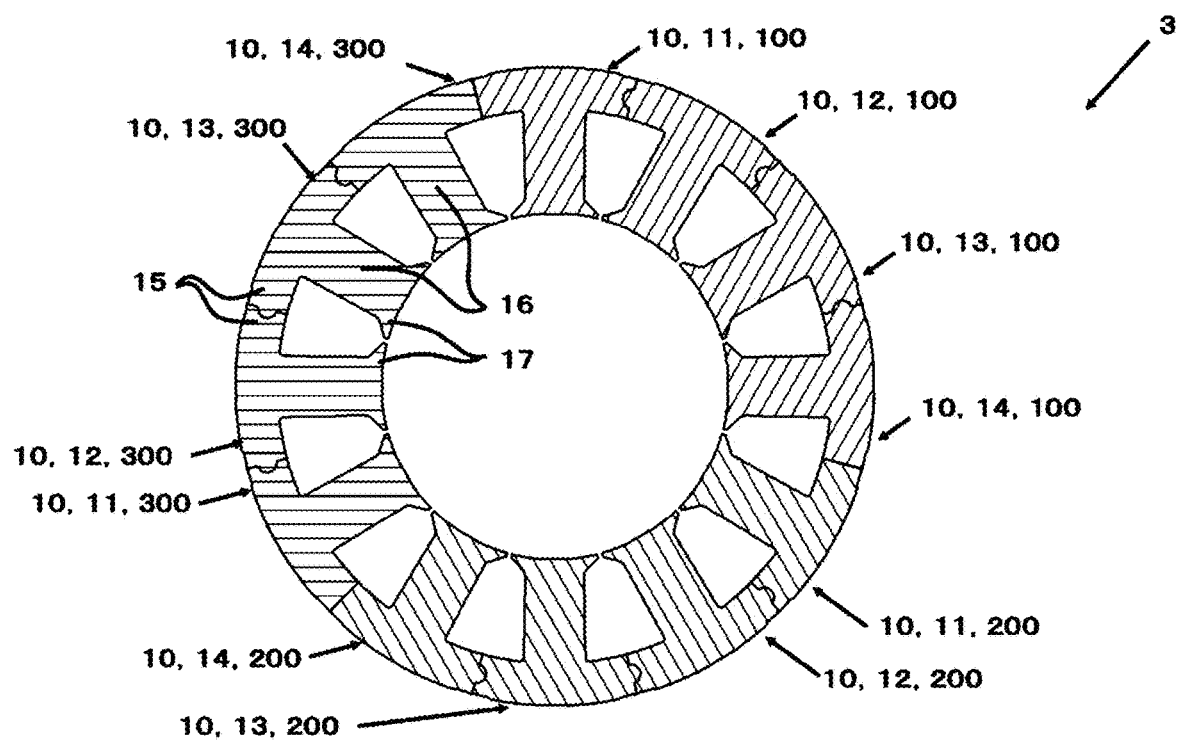
FIG. 3 is a plan view of a stator according to an example embodiment of the present disclosure.

FIG. 2 is a perspective view of the stator according to the present example embodiment. FIG. 3 is a plan view of the stator according to the present example embodiment.

As illustrated in FIGS. 2 and 3, the stator 3 includes 12 split cores 10 arranged in a circumferential direction. As illustrated in FIG. 1, in each of the split cores 10, a coil 7, in which a conductor wire is wound, is mounted together with an insulator.

As illustrated in FIGS. 2 and 3, the split core 10 is formed by stacking materials punched out from an electrical steel sheet ESS (see FIG. 8) in the axial direction, and is a generic term for a first split core 11, a second split core 12, a third split core 13, and a fourth split core 14.

Figure 4:
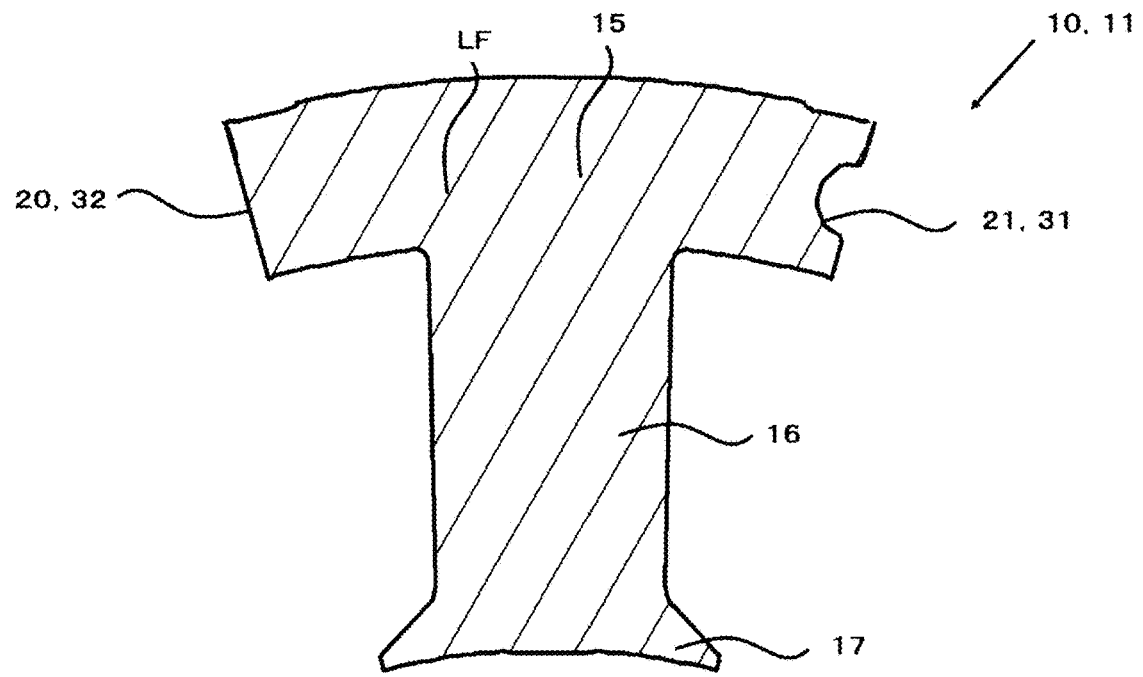
FIG. 4 is a plan view of a split core according to an example embodiment of the present disclosure.
Figure 5:
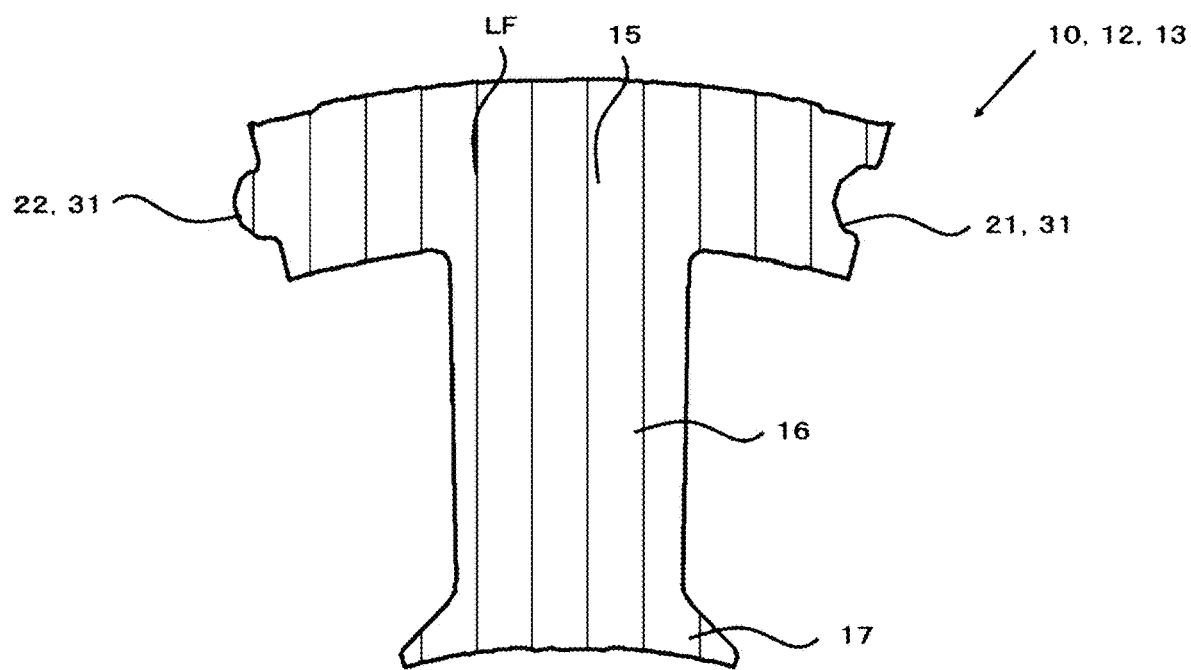
FIG. 5 is a plan view of a split core according to an example embodiment of the present disclosure.
Figure 6:
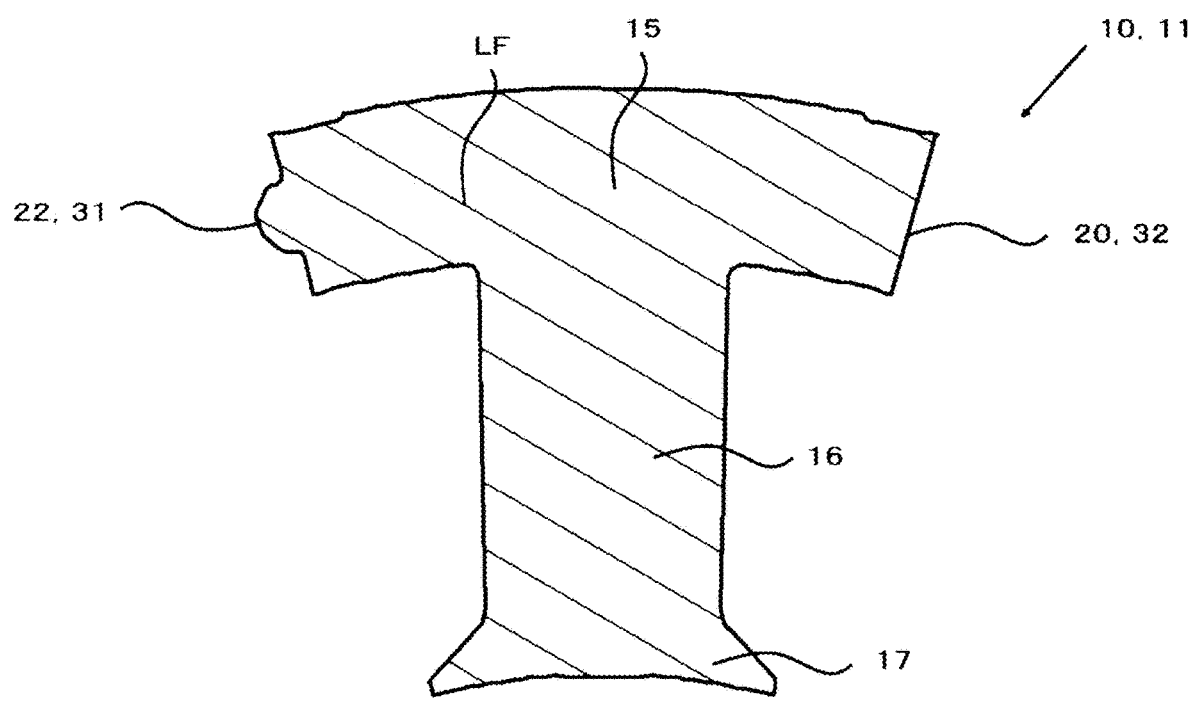
FIG. 6 is a plan view of a split core according to an example embodiment of the present disclosure.

FIG. 4 is a plan view of a split core according to the present example embodiment. Specifically, FIG. 4 is a plan view of the first split core. FIG. 5 is a plan view of a split core according to the present example embodiment. Specifically, FIG. 5 is a plan view of the second split core and the third split core. FIG. 6 is a plan view of a split core according to the present example embodiment. Specifically, FIG. 6 is a plan view of the fourth split core.

First, common configurations of the first split core 11, the second split core 12, the third split core 13, and the fourth split core 14 will be described.

As illustrated in FIGS. 4, 5, and 6, the split core 10 has a core back 15 extending in the circumferential direction, a tooth 16 extending inward in a radial direction from a central portion in the circumferential direction of the core back 15, and an umbrella portion 17 extending from a distal end portion on the inner side in the radial direction of the tooth 16 toward both sides in the circumferential direction.

Next, different configurations in the first split core 11, the second split core 12, the third split core 13, and the fourth split core 14 will be described. Note that the different configurations are shapes of both end portions in the circumferential direction of the core back 15.

As illustrated in FIG. 4, in the first split core 11, an end face on one side in the circumferential direction of the core back 15 has a connection concave portion 21 that is recessed toward another side in the circumferential direction. In the first split core 11, an end face on the other side in the circumferential direction of the core back 15 is a connection surface 20 which is a plane extending along the axial direction and the radial direction.

As illustrated in FIG. 5, in the second split core 12, an end face on one side in the circumferential direction of the core back 15 has the connection concave portion 21 that is recessed toward another side in the circumferential direction. In the second split core 12, an end face on the other side in the circumferential direction of the core back 15 has a connection convex portion 22 that protrudes toward the other side in the circumferential direction. As illustrated in FIGS. 2 and 3, the connection convex portion 22 fits into the connection concave portion 21 of the first split core 11.

As illustrated in FIG. 5, the third split core 13 has the same configuration as that of the second split core 12. As illustrated in FIGS. 2 and 3, the connection convex portion 22 of the third split core 13 fits into the connection concave portion 21 of the second split core 12.

As illustrated in FIG. 6, in the fourth split core 14, an end face on one side in the circumferential direction of the core back 15 is a connection surface 20 which is the plane extending along the axial direction and the radial direction. In the fourth split core 14, an end face on another side in the circumferential direction of the core back 15 has the connection convex portion 22 that protrudes toward the other side in the circumferential direction. As illustrated in FIGS. 2 and 3, the connection convex portion 22 fits into the connection concave portion 21 of the third split core 13.

Note that, in the present example embodiment, a boundary between the respective split cores 10 in which the connection convex portion 22 fits into the connection concave portion 21 is defined as a first boundary portion 31.

As illustrated in FIG. 3, the 12 split cores 10 are classified into three sets of a first core group 100, a second core group 200, and a third core group 300, four by four.

More specifically, the first core group 100, the second core group 200, and the third core group 300 are arranged toward the one side in the circumferential direction in this order.

The first core group 100 includes the first split core 11, the second split core 12, the third split core 13, and the fourth split core 14. The first split core 11, the second split core 12, the third split core 13, and the fourth split core 14 are arranged toward the one side in the circumferential direction in this order.

The second core group 200 has the same configuration as the first core group 100, and includes the first split core 11, the second split core 12, the third split core 13, and the fourth split core 14. The first split core 11, the second split core 12, the third split core 13, and the fourth split core 14 are arranged toward the one side in the circumferential direction in this order.

The third core group 300 has the same configuration as the first core group 100, and includes the first split core 11, the second split core 12, the third split core 13, and the fourth split core 14. The first split core 11, the second split core 12, the third split core 13, and the fourth split core 14 are arranged toward the one side in the circumferential direction in this order.

The connection surface 20 of the fourth split core 14 included in the first core group 100 is in surface contact with the connection surface 20 of the first split core 11 included in the second core group 200. The connection surface 20 of the fourth split core 14 included in the second core group 200 is in surface contact with the connection surface 20 of the first split core 11 included in the third core group 300. The connection surface 20 of the fourth split core 14 included in the third core group 300 is in surface contact with the connection surface 20 of the first split core 11 included in the first core group 100.

Note that, in the present example embodiment, a boundary between the respective split cores 10 in which the connection surfaces 20 are in contact with each other is defined as a second boundary portion 32.

Figure 8:
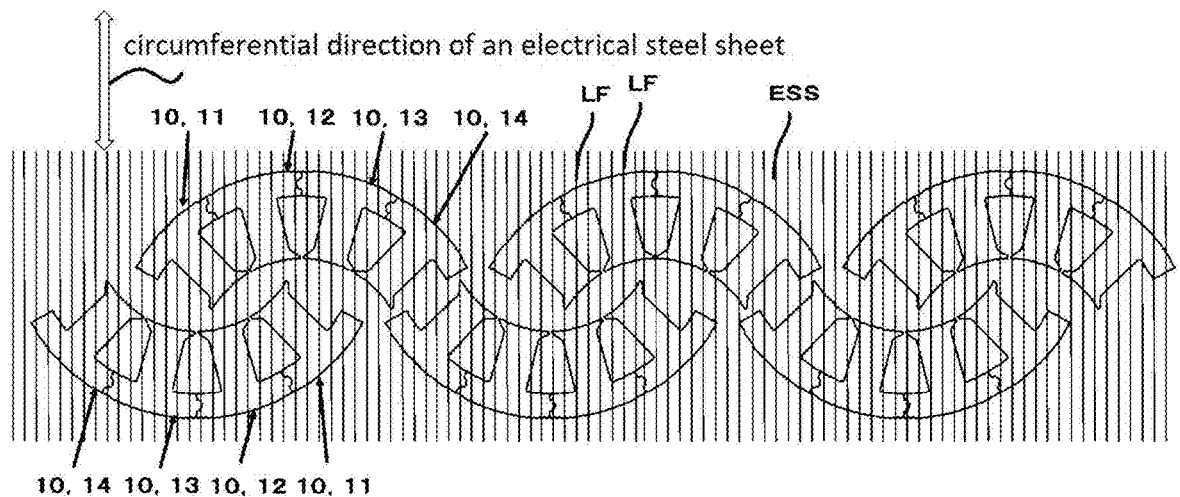
FIG. 8 is a plan view illustrating the split cores punched out from an electrical steel sheet in which linear flaws are illustrated in an example embodiment of the present disclosure.

As illustrated in FIGS. 2 and 8, the split core 10 is formed by laminating the electrical steel sheets ESS each of which is a rolled material. There are a number of linear flaws LF on a surface of the electrical steel sheet ESS which is the rolled material. Accordingly, there are linear flaws LF on a surface of each split core 10 punched out from the electrical steel sheet ESS.

Next, a method for manufacturing a stator will be described.

Figure 7:
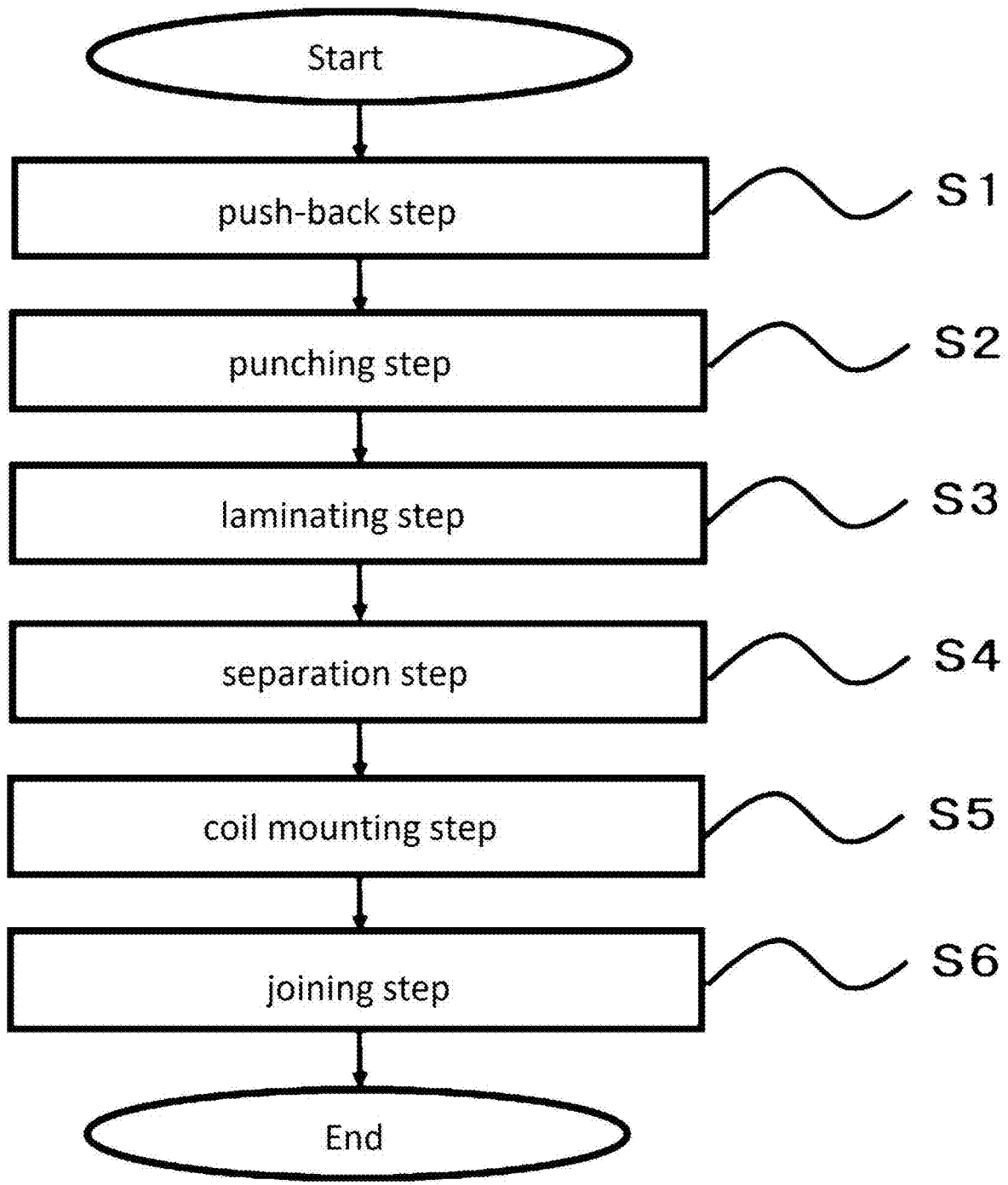
FIG. 7 is a schematic diagram illustrating a manufacturing process of a stator according to an example embodiment of the present disclosure.
Figure 9:
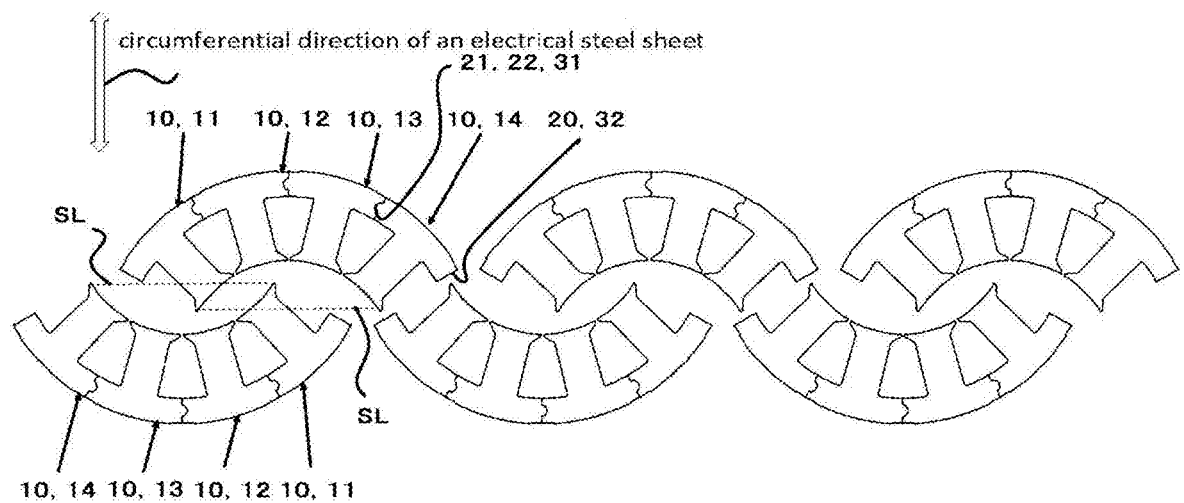
FIG. 9 is a plan view illustrating the split cores punched out from the electrical steel sheet in which linear flaws are omitted in an example embodiment of the present disclosure.
Figure 10:
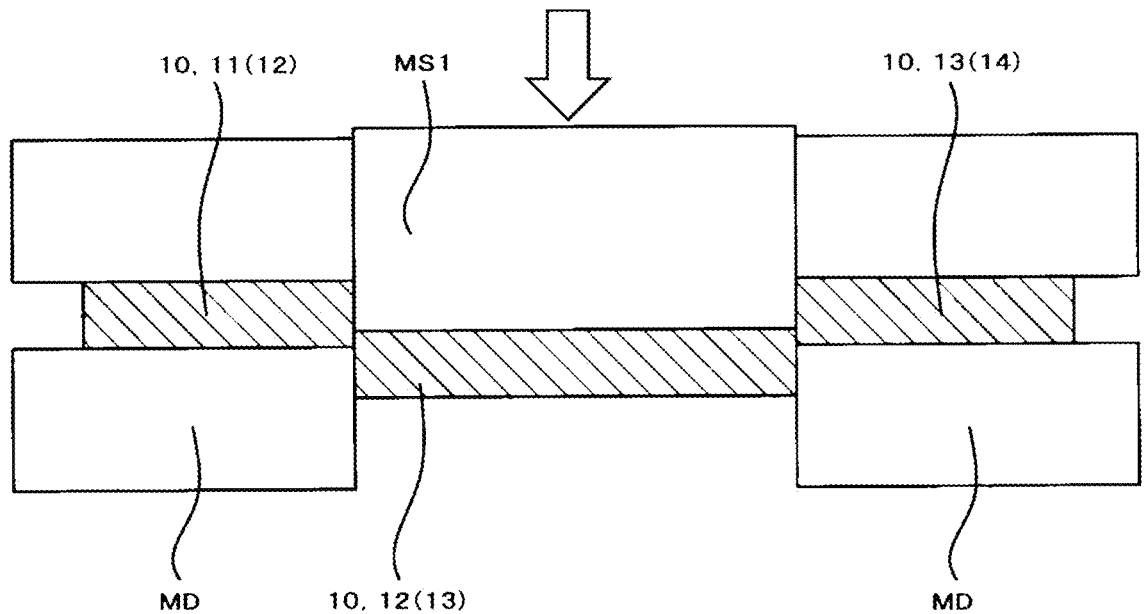
FIG. 10 is a sectional view illustrating push-back processing.
Figure 11:
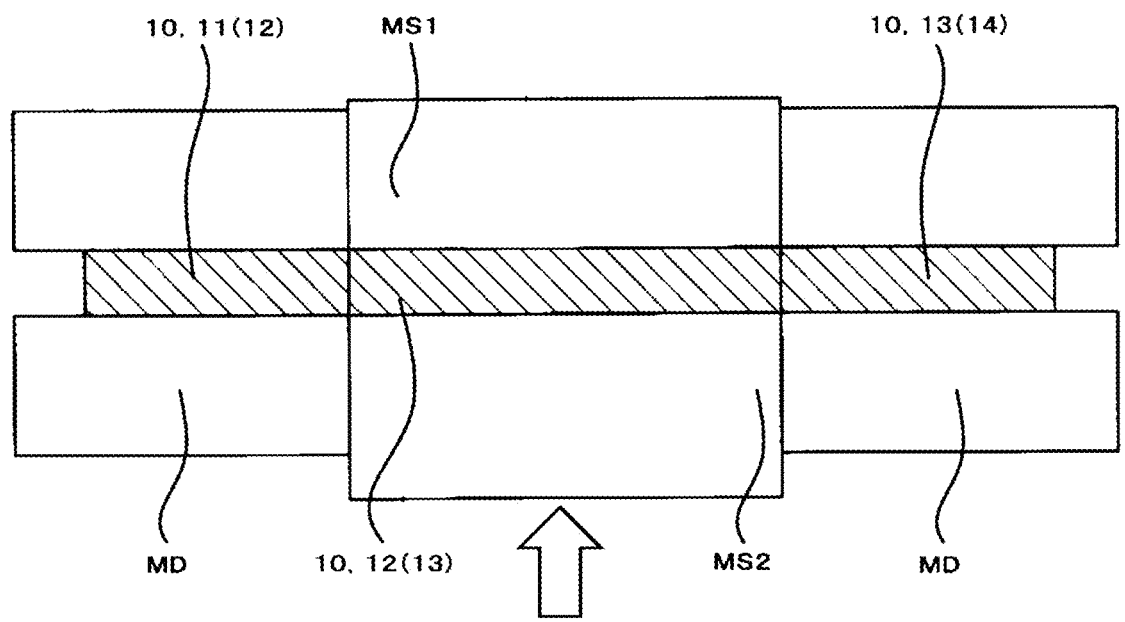
FIG. 11 is a sectional view illustrating push-back processing.

FIG. 7 is a schematic diagram illustrating a process of manufacturing the stator according to the present example embodiment. FIG. 8 is a plan view illustrating split cores punched out from the electrical steel sheet on which the linear flaws are illustrated in the present example embodiment. FIG. 9 is a plan view illustrating split cores punched out from the electrical steel sheet in which the linear flaws are omitted in the present example embodiment. FIGS. 10 and 11 are sectional views illustrating push-back processing.

As illustrated in FIG. 7, the stator 3 is manufactured through a push-back step S1, a punching step S2, a laminating step S3, a separation step S4, a coil mounting step S5, and a joining step S6. Next, each step will be described in detail.

In the push-back step S1, as illustrated in FIGS. 10 and 11, the second split core 12 is pushed back by a push-up tool Ms2 arranged so as to face a tool Ms1 in a direction opposite to a direction in which the second split core 12 projects for the first split core 11 and the third split core 13 held by a mold MD. Then, the second split core 12 is pushed back to an original position, that is, to a position of the first split core 11 and the third split core 13. Next, the same processing is performed for the third split core 13. As a result, as illustrated in FIGS. 8 and 9, the first boundary portions 31 are formed in the electrical steel sheet ESS.

In the punching step S2, the split cores 10 are punched out from the electrical steel sheet ESS in group units. That is, the split cores 10 are punched out from the electrical steel sheet ESS as one set of the first split core 11, the second split core 12, the third split core 13, and the fourth split core 14 (group punching step). Note that, a portion between the first split core 11 and the second split core 12, a portion between the second split core and the third split core 13, and a portion between the third split core 13 and the fourth split core 14, that are subjected to push-back processing, remain connected to each other even after being punched out from the electrical steel sheet ESS.

Note that, as illustrated in FIGS. 8 and 9, the split cores 10 are punched out from the electrical steel sheet ESS in group units. At this time, the split cores 10 of each group are punched out in a state in which the split core 10 constituting another group enters a core back 15 side of the split core 10 constituting one group relative to the line segment SL connecting the umbrella portions 17 of the split cores 10 constituting the one group and located on both sides in the circumferential direction. In the present example, a direction in which the line segment SL extends in the one group and a direction in which the line segment SL in the other group extends are parallel to each other. As a result, the yield of the electrical steel sheet ESS in the manufacturing of the stator 3 is improved.

Further, the linear flaws LF on the split cores 10 are fixed regardless of the punching position on the electrical steel sheet ESS. More precisely, regardless of the punching position, the linear flaws LF on the first split core 11 extend in the same direction even though the groups are different. Similarly, in the second split core 12, the third split core 13, and the fourth split core 14, the linear flaws LF also extend in the same direction.

In the laminating step S3, the required number of split cores 10, each of which is a set of four punched out in group units, are laminated in the axial direction, and, for example, are clamped in the axial direction to integrate them.

In the separation step S4, the split cores 10 clamped in the axial direction are separated at the first boundary portion 31.

In the coil mounting step S5, the coil 7 is mounted to the split core 10 separated in the separation step S4.

In the joining step S6, the first boundary portions 31 of the split cores 10 on which the coils 7 are mounted in the coil mounting step S5 are butted against each other again. Since the first boundary portions 31 are portions that have been subjected to the push-back processing, the connection convex portion 22 fits into the connection concave portion 21. Therefore, rejoining is easy and positional shift is less likely to occur. Thus, each group in which the coils are wound is manufactured. Then, the three groups manufactured through the above steps are joined together. More specifically, in the stator 3, after the three second boundary portions 32 are abutted, the abutted portions are welded.

Through the above-described steps, the stator 3 is manufactured.

The electrical steel sheet ESS is a rolled material. Therefore, as illustrated in FIG. 8, there are the linear flaws LF on the surface of the electrical steel sheet ESS. Accordingly, there are the linear flaws LF on the surface of each split core 10 punched out from the electrical steel sheet ESS.

The respective split cores 10 of each group are integrally punched out from the electrical steel sheet ESS. Therefore, the linear flaws LF on the split cores 10 continue across the first boundary portion 31 that defines the split cores 10 in each group. In other words, the linear flaws LF on the split cores 10 adjacent to each other in the circumferential direction continue across the first boundary portion 31 that defines the split cores 10 in each the group. On the other hand, the linear flaws LF on the split cores 10 of the respective groups intersect with each other with the second boundary portion 32 which defines the split cores 10 of the groups interposed therebetween.

Next, an operation and an effect of the stator 3 manufactured through the manufacturing process will be described.

(1) (2) The stator 3 has the 12 split cores 10 punched out from the electrical steel sheet ESS and arranged in the annular shape. As illustrated in FIG. 3, among the 12 split cores 10, the rolling directions of the first split core 11, the second split core 12, the third split core 13, and the fourth split core 14, which are adjacent to each other in the circumferential direction with the first boundary portion 31 interposed therebetween, are the same direction. That is, the linear flaws LF continue with the first boundary portion 31 interposed therebetween. Further, the rolling directions of the first split core 11 and the fourth split core 14 adjacent to each other in the circumferential direction with the second boundary portion 32 interposed therebetween are different from each other. That is, the linear flaws LF intersect with each other with the second boundary portion 32 interposed therebetween.

According to this configuration, in the stator 3, the four split cores 10 are punched out from the electrical steel sheet ESS in a continuous state in the circumferential direction. Therefore, the four split cores 10 which continue in the circumferential direction and arranged in an arc shape are likely to be arranged with a curvature as designed. In addition, the 12 split cores 10 arranged in the annular shape are likely to be arranged with the curvature as designed. As a result, the motor 1 having the stator 3 easily exhibits a performance as designed.

In addition, since the first boundary portion 31 is subjected to push-back processing, it is easy to split or reassemble the split cores 10 at the first boundary portion 31. Further, the positional shift between the split cores 10 at the first boundary portion 31 is less likely to occur.

(3) (4) (5) The second boundary portions 32 at which the linear flaws LF intersect are provided at three locations. The three second boundary portions 32 are located at equal intervals in the circumferential direction. The linear flaws LF of the split cores 10 are three sets of a first core group 100, a second core group 200, and a third core group 300. Since each core group includes the four split cores 10, the second boundary portions 32 are provided at 120° intervals in the circumferential direction. Therefore, components that affect the line characteristics of the motor, such as cogging torque, cancel each other out. As a result, the motor 1 more easily exhibits the performance as designed.

(7) The four split cores 10 less than 12 are punched out from the electrical steel sheet ESS in a state in which the arc-shaped core backs 15 extend in the same circumferential direction and are connected to each other. According to this method, it is unnecessary to perform a step of arranging the split cores in an arc shape by bending the split cores around the connected portions, which is conventionally required in the related art. Since strain is unlikely to occur in the core back of the split core 10 to be connected, the motor can easily exhibit the performance as designed.

(8) The plurality of split cores 10 are punched out from the electrical steel sheet ESS in a state in which the split core 10 constituting one group and located at one end portion on one side in the circumferential direction is arranged so as to be located alternately between the split cores 10 constituting another group and located at both ends in the circumferential direction. The yield of the electrical steel sheet ESS is good because the punching is performed in a state in which the split cores 10 alternately arranged. Note that, as illustrated in FIGS. 8 and 9, the state of being arranged alternately refers to a state in which the first split core 11 constituting the one group, the first split core 11 constituting the other group, the fourth split core 14 constituting the one group, and the fourth split core 14 constituting the other group are alternately arranged.

(9) In addition, the plurality of split cores 10 are punched out from the electrical steel sheet ESS in a state in which the split core 10 constituting one group and located at one end portion on one side in the circumferential direction is arranged on the core back 15 side of the split core 10 that constitutes another group relative to the line segment connecting the radially inner portions of the split cores 10 constituting the other group and located at both ends in the circumferential direction. Since the split cores 10 are punched out in a dense state, the yield of the electrical steel sheet ESS is good.

(10) (14) The Y split cores 10 constituting one group are subjected to push-back processing. After each split core 10 is split from the adjacent split core 10 and the coil 7 is mounted thereon, the split core 10 is rejoined to the split core 10 before having been split. Since the split cores 10 processed by the same die are joined together, they are easily joined with high accuracy.

(11) Note that the Y split cores 10 constituting one group are subjected to push-back processing, and then punched out from the electrical steel sheet ESS. Since the split cores 10 are subjected to push-back processing by the die before punching, the accuracy is high.

(13) Further, by the push-back processing, the connection concave portion 21 is formed on one of the adjacent split cores 10, and the connection convex portion 22 that fits into the connection concave portion 21 is formed on another of the adjacent split cores 10. According to this method, the fitting is good when the split cores 10 are fitted again to each other, and rattling between the adjacent split cores 10 is suppressed.

Next, a modification of the present example embodiment described above will be described.

(12) The Y split cores 10 constituting one group may be punched out from the electrical steel sheet ESS and then subjected to push-back processing. That is, the push-back step S1 and the punching step S2 may be reversed. A machine for punching the split cores 10 from the electrical steel sheet ESS and a machine for performing the push-back processing are separately provided, thereby facilitating the maintenance of the respective machines.

Figure 12:
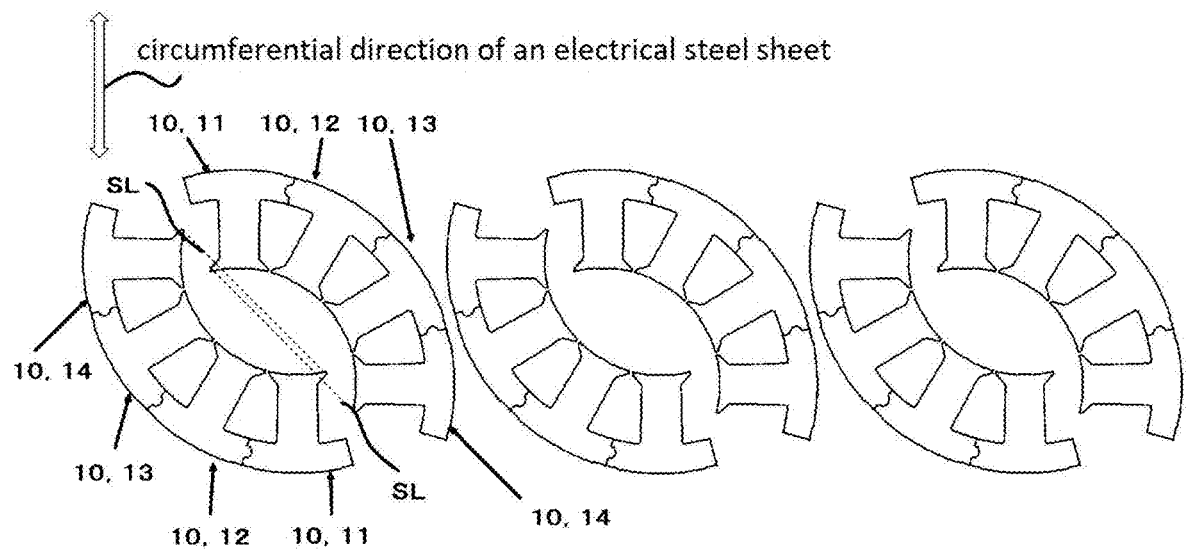
FIG. 12 is a plan view illustrating split cores punched out from an electrical steel sheet in a modification of an example embodiment of the present disclosure.
Figure 13:
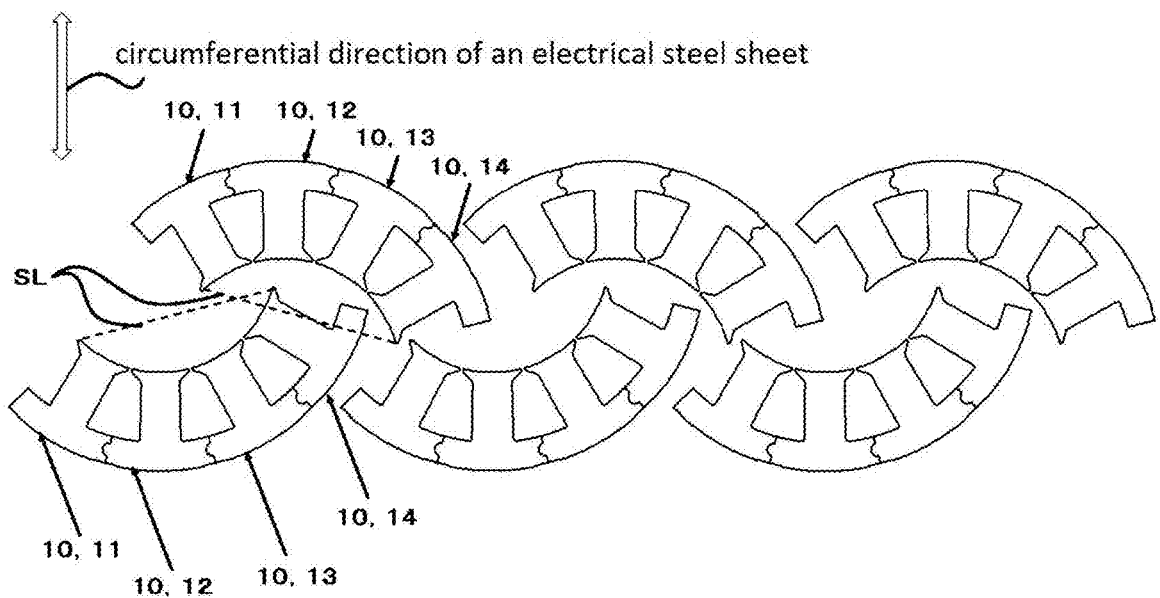
FIG. 13 is a plan view illustrating split cores punched out from an electrical steel sheet in a modification of an example embodiment of the present disclosure.

In the punching step S2, the split cores 10 may be punched out as illustrated in FIGS. 12 and 13 below.

FIGS. 12 and 13 are plan views illustrating split cores punched out from the electrical steel sheet in the modification.

As illustrated in FIG. 12, each of the split cores 10 of each group may be punched out in a state in which a direction in which the tooth 16 of the fourth split core 14 constituting one group extends and a direction in which the tooth 16 of the fourth split core 14 constituting another group extends are parallel to each other. Further, in FIG. 12, each of the split cores 10 of each group is punched out in a state in which the fourth core 14 constituting the one group and the fourth core 14 constituting the other group face each other in the circumferential direction. Also in this modification, similarly to the present example embodiment described above, each of the split cores 10 of each group is punched out in a state in which the split core 10 constituting another group enters a core back 15 side of the split core 10 constituting one group relative to the line segment SL connecting the umbrella portions 17 of the split cores 10 constituting the one group and located on both sides in the circumferential direction. As a result, the yield of the electrical steel sheet ESS in the manufacturing of the stator 3 is improved.

Note that, in the example embodiment and the modification described above, as the state in which the split cores 10 are alternately arranged in the electrical steel sheet ESS, the case has been described in which the split cores 10 constituting the one group and the split cores 10 constituting the other group are located closer to the other's tooth 16 side than the other's core back 15 side. However, the arrangement of the split cores 10 is not limited to this arrangement.

Figure 15:
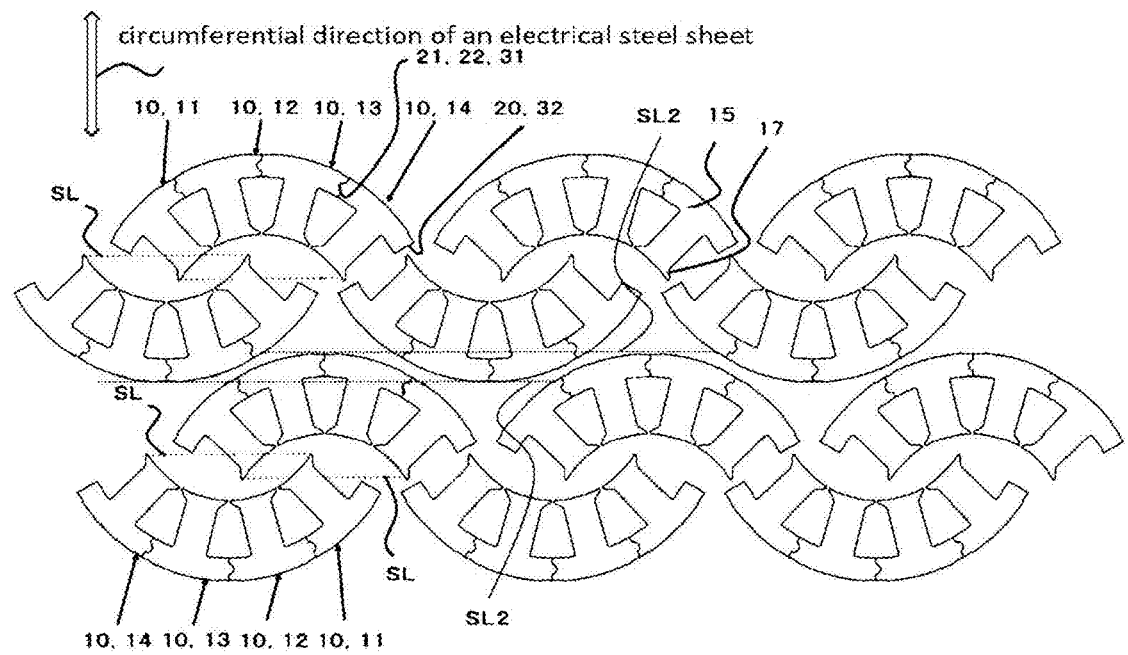
FIG. 15 is a plan view illustrating split cores punched out from an electrical steel sheet in a modification of an example embodiment of the present disclosure.

FIG. 15 is a plan view illustrating split cores punched out from the electrical steel sheet in the modification. For example, as illustrated in FIG. 15, as a state in which the split cores 10 are alternately arranged in the electrical steel sheet ESS, the split cores 10 constituting the one group and the split cores 10 constituting the other group may be located closer to the other's core back 15 side than the other's tooth 16 side.

More specifically, as illustrated in FIG. 15, when a line segment SL2 parallel to the line segment SL is described as a tangent line of the core backs 15, the split cores 10 of each group are arranged so as to intersect with the line segment SL2 described on the split cores 10 of the other group. When each of the split cores 10 in each group are arranged in the electrical steel sheet ESS as described above, the yield is further improved.

As described above, the split core 10 constituting the one group and the split core 10 constituting the other group are located closer to the other's core back 15 side than the other's tooth 16 side, and are located closer to the other's tooth 16 side than the other's core back 15 side, thereby further improving the yield of the electrical steel sheet ESS.

As illustrated in FIG. 13, each of split cores 10 of each group may be punched out in a state in which directions in which the teeth 16 of the split cores 10 constituting one group extend and directions in which the teeth 16 of the split cores 10 constituting another group extend are not all in parallel. Also in this modification, similarly to the example embodiment described above, each of the split cores 10 of each group is punched out in a state in which the split core 10 constituting another group enters a core back 15 side of the split core 10 constituting one group relative to the line segment SL connecting the umbrella portions 17 of the split cores 10 constituting the one group and located on both sides in the circumferential direction. Accordingly, since each of the split cores 10 can be punched out in a state where the split cores 10 constituting the one group are closer to the split cores 10 constituting the other group, the yield of the electrical steel sheet ESS for manufacturing the stator 3 is improved. Note that, as illustrated in this modification, the split cores 10 constituting the one group and the split cores 10 constituting the other group may be punched out from the electrical steel sheet ESS in an inverted state.

Further, the split cores 10 illustrated in FIGS. 12 and 13 are also alternately arranged, similarly to the split cores illustrated in FIG. 8 of the example embodiment described above.

The plurality of split cores 10 may be punched out from the electrical steel sheet ESS in a state in which the split core 10 constituting one group and located at one end portion on one side in the circumferential direction is arranged on the side opposite to the core back 15 side of the split cores 10 that constitutes another group relative to the line segment connecting the radially inner portions of the split cores 10 constituting the other group and located at both ends in the circumferential direction.

The connection concave portion 21 and the connection convex portion 22 may be omitted.

The split core 10 that has been subjected to the push-back processing may not be rejoined to the split core 10 before having been split after the split core 10 is split from the adjacent split core 10 and the coil 7 is mounted.

The split core 10 according to the example embodiment described above is subjected to the push-back processing, so that the first boundary portion 31 is formed. However, a method for forming the first boundary portion 31 is not limited to the push-back processing. For example, the first boundary portion 31 may be formed by punching, which is a method for forming the second boundary portion 32. In addition, the first boundary portion 31 may be formed by various bending processes. Various processing methods can be adopted as long as the linear flaws LF on the split cores 10 adjacent to each other in the circumferential direction continue across the first boundary portion 31.

Although the split cores 10 constitute the one group with four pieces, the number of split cores 10 constituting one group may appropriately be set. Note that it is desirable that the number of the split cores 10 be the same in all the groups. When the number of split cores 10 is not the same in all the groups, the intersections of the linear flaws LF are not evenly spaced in the circumferential direction.

Although the stator 3 is constituted of three groups, the number of groups constituting the stator 3 can appropriately be set. In addition, in the example embodiment described above, the linear flaws LF of the split cores 10 provided on the 12-slot stator 3 are 3n (n=1) sets. As a result, the second boundary portion 32 can be arranged at equal angular intervals, and an effect of reducing cogging torque or the like can be obtained. However, even when n=2, the same effect can be obtained.

The stator 3 has X split cores punched out from the electrical steel sheet, that is, X=12 split cores 10 in the example embodiment described above. However, the number is not limited to this, and any appropriate number may be set. In addition, although one group is constituted by Y split cores less than X split cores, that is, Y=4 split cores 10 in the example embodiment described above, the number is not limited to this, and any appropriate number may be set.

In the example embodiment described above, in the split cores 10 provided in the stator 3 of 12-slot, the number of the split cores 10 in which the linear flaws LF continue is 4n (n=1). Accordingly, the second boundary portion 32 can be arranged at equal angular intervals, and an effect of reducing cogging torque and the like can be obtained. For example, in a case of having 24 split cores 10, that is, in a case of a 24-slot stator 3, when the number of split cores 10 in which the linear flaws LF continue is 4n (n=1, 2, 3), the second boundary portion 32 can be arranged at equal angular intervals, and an effect of reducing cogging torque and the like can be obtained.

Figure 16:
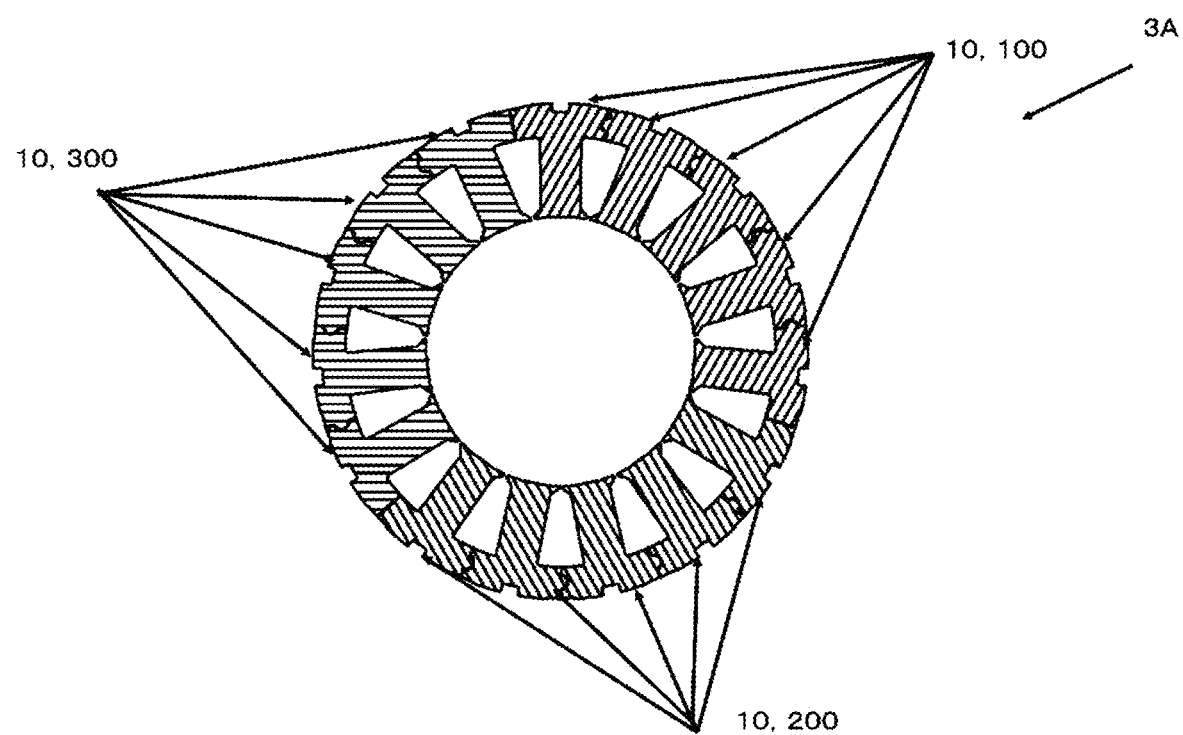
FIG. 16 is a plan view of a stator according to a modification of an example embodiment of the present disclosure.

FIG. 16 is a plan view of a stator according to the modification.

As illustrated in FIG. 16, a stator 3A has 15 split cores 10 arranged in an annular shape. The stator 3A has X split cores punched out from the electrical steel sheet, that is, X=15 split cores 10 in the present modification, and one group is formed by Y split cores less than X split cores (15 split cores), that is, Y=5 split cores 10 in the present modification. That is, similarly to the example embodiment described above, the linear flaws LF on the split cores 10 in the stator 3A are three sets of the first core group 100, the second core group 200, and the third core group 300. As in the example embodiment described above and the present modification, when one group is constituted by split cores divided by the number of phases for the number of slots where the coils are mounted, the number of split cores 10 having linear flaws in the same direction is equal, and the group constituted by split cores 10 having linear flaws in the same direction can be arranged at equal angular intervals. Thereby, the effect of reducing the cogging torque and the like can be obtained.

Figure 14:
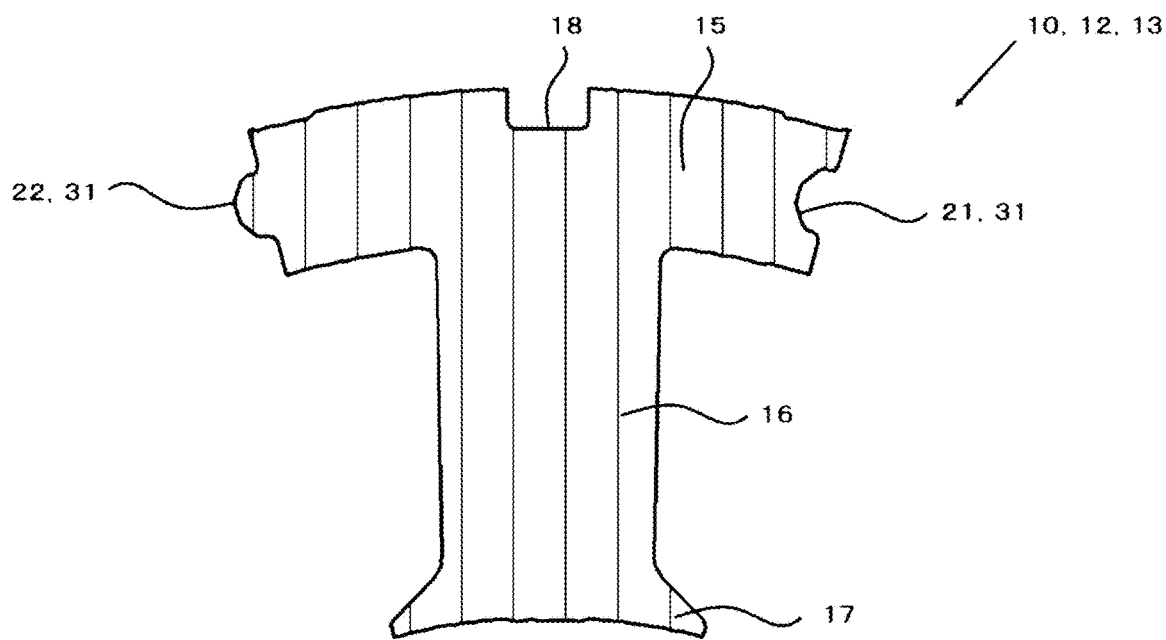
FIG. 14 is a plan view of a split core according to a modification of an example embodiment of the present disclosure.

FIG. 14 is a plan view of a split core according to the modification.

As illustrated in FIG. 14, a groove 18 may be provided in the core back 15. For example, when the groove 18 is provided in the circumferential central portion of the core back 15, it is possible to reduce the weight of the split core 10 and thus the stator 3. Further, the split core 10 having the groove 18 has small influence on magnetic characteristics in comparison with the split core 10 without the groove 18. When the groove 18 is provided, it is preferable to punch out the electrical steel sheet ESS before the push-back step S1.

The umbrella portion 17 may be omitted.

In the example embodiment described above, the application destination of the motor is not limited to the electric power steering device. The motor may be applied to other devices such as motors used for an oil pump and a driving source for driving a vehicle.

The example embodiment and modification described above may be combined with each other within a technically consistent range.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
a plurality of discontinuous individual split cores defined by portions of laminated electrical steel sheets which have been punched into a specific shape; wherein
the plurality of discontinuous individual split cores are connected to each other to define an annular shape; and
a first group of the plurality of discontinuous individual split cores directly adjacent to each other in a circumferential direction have a same rolling direction, and a second group of the plurality of discontinuous individual split cores directly adjacent to each other in the circumferential direction have different rolling directions.

2. The stator according to claim 1, wherein linear flaws continue across the first group of the plurality of discontinuous individual split cores directly adjacent to each other in the circumferential direction.

3. The stator according to claim 1, wherein
linear flaws of the second group of the plurality of discontinuous individual split cores directly adjacent to each other in the circumferential direction intersect each other; and
intersections of the linear flaws are located at equal or substantially equal intervals in the circumferential direction.

4. The stator according to claim 2, wherein the linear flaws of the plurality of discontinuous individual split cores are 3n sets, where n is a natural number.

5. The stator according to claim 2, wherein a number of the plurality of discontinuous individual split cores in which the linear flaws continue is 4n, where n is a natural number.

6. The stator according to claim 2, wherein a number of the plurality of discontinuous individual split cores in which the linear flaws continue is a number obtained by dividing a number of slots, which are portions in which coils are mounted, by a number of phases.

7. A motor comprising:
the stator according to claim 1; and
a rotor facing the stator.

8. A method for manufacturing a stator including X discontinuous individual split cores punched out from an electrical steel sheet, where X is a natural number of two or more, the method comprising:
punching out the X discontinuous individual split cores from the electrical steel sheet in group units of Y less than X with arc-shaped core backs extending in a same circumferential direction and connected to each other, where Y is a natural number of two or more;
mounting coils on the X discontinuous individual split cores; and
assembling an annular shape from the X discontinuous individual split cores with direct adjacent ones of the X discontinuous individual split cores having come from directly adjacent portions of the electrical steel sheet.

9. The method for manufacturing a stator according to claim 8, wherein
the X discontinuous individual split cores are punched out from the electrical steel sheet in a state where the X discontinuous individual split core of one group and located at an end portion on one side in a circumferential direction is alternately arranged between the X discontinuous individual split cores of another group and located at both end portions in the circumferential direction.

10. The method for manufacturing a stator according to claim 8, wherein the X discontinuous individual split cores are punched out from the electrical steel sheet in a state where the split core of one group and located at an end portion on one side in a circumferential direction is arranged on a core back side of the split core of another group relative to a line segment connecting radially inner portions of the split cores of another group and located at both end portions in the circumferential direction.

11. The method for manufacturing a stator according to claim 8, wherein the split core of one group and the split core of another group are located closer to a mutual core back side than a mutual tooth side.

12. The method for manufacturing a stator according to claim 8, further comprising:
causing Y split cores of one group to be subjected to push-back processing.

13. The method for manufacturing a stator according to claim 12, wherein the Y split cores of the one group are punched out from the electrical steel sheet after being subjected to the push-back processing.

14. The method for manufacturing a stator according to claim 12, wherein the Y split cores of the one group are subjected to the push-back processing after being punched out from the electrical steel sheet.

15. The method for manufacturing a stator according to claim 13, further comprising:
forming, by the push-back processing, a connection concave portion on one of the directly adjacent X discontinuous individual split cores, and a connection convex portion, which fits into the connection concave portion, on another of the directly adjacent X discontinuous individual split cores.

16. The method for manufacturing a stator according to claim 15, further comprising:
splitting the split core subjected to the push-back processing from the adjacent split core, mounting a coil on the split core, and rejoining the split core to the adjacent split core before having been split.

* * * * *